United States Patent [19]
Kalmer et al.

[11] Patent Number: 5,673,680
[45] Date of Patent: Oct. 7, 1997

[54] GAS-HEATED APPARATUS

[75] Inventors: Christoph Paul Kalmer, Rückersdorf; Gerhard Becke, Forchheim; Karlheinz Hammelsbacher, Schwabach, all of Germany

[73] Assignee: Diehl GmbH & Co., Nuremberg, Germany

[21] Appl. No.: 490,835

[22] Filed: Jun. 15, 1995

[30] Foreign Application Priority Data

Jun. 18, 1994 [DE] Germany ............... 44 21 361.1

[51] Int. Cl.⁶ ............................................. F24C 3/00
[52] U.S. Cl. ............................... 126/39 BA; 126/39 R; 431/73
[58] Field of Search .................. 126/39 BA, 39 R; 431/74, 75; 251/129.01, 129.04, 129.09, 129.15; 137/78.4

[56] References Cited

U.S. PATENT DOCUMENTS

| | | | |
|---|---|---|---|
| 4,125,357 | 11/1978 | Kristen et al. | 126/39 J X |
| 4,461,940 | 7/1984 | Ishimura | 219/10.55 |
| 4,663,710 | 5/1987 | Waugh et al. | 364/400 |
| 4,993,401 | 2/1991 | Drekmann et al. | 126/39 BA X |
| 5,099,822 | 3/1992 | Cramer et al. | 126/39 J X |
| 5,575,638 | 11/1996 | Witham et al. | 431/73 |

FOREIGN PATENT DOCUMENTS 0 352 217   1/1990   European Pat. Off. .

*Primary Examiner*—Larry Jones
*Attorney, Agent, or Firm*—Scully, Scott, Murphy & Presser

[57] ABSTRACT

The invention concerns a gas-heated apparatus, in particular a cooking appliance with at least one glass ceramic cooking surface with a gas heating means of conventional configuration and two mutually independent safety paths for monitoring the electronic control device. The one safety path monitors actuation for each consumer while the other safety path monitors the flow of current through said consumer. The control device can be of a particularly simple structure by virtue of being designed in the form of a digital circuit. The consumers to be monitored are the solenoid valves and/or gas burners.

10 Claims, 2 Drawing Sheets

GAS-HEATED APPARATUS

BACKGROUND OF THE INVENTION

The invention concerns a gas-heated apparatus, in particular a cooking appliance having at least one glass ceramic cooking surface or panel, wherein the apparatus has a gas jet burner, a safety relay and a solenoid valve monitored by the relay, in the gas supply device, and wherein an electrical control device for operation of the apparatus inter alia has two mutually independent safety paths for monitoring safety-sensitive consumers such as solenoid valves or burners.

The invention is suitable for use in relation to gas cookers, gas heating equipment, and gas boilers, but preferably in relation to glass ceramic cooking surfaces or panels with gas heating.

1. Field of the Invention

In the case of glass ceramic cooking surfaces or panels, the heating effect can be produced electrically or by means of gas. In the case of gas heating, particular precautions are prescribed for safe operation of the cooking appliance in order very substantially to prevent accidents from occurring due to escaping gas. The structure of a glass ceramic cooking panel using gas jet burners, solenoid valves, incandescence igniters and temperature monitoring devices is known and is not the subject-matter of the present invention.

2. Discussion of the Prior Art

For safety reasons the electronic control device for operation of the burners, incandescence igniters and solenoid valves, temperature monitoring and the like must have two mutually independent safety paths in order to guarantee proper functioning of the electronic system in regard to control of the burners or solenoid valves.

Therefore the object of the present invention is to propose a simple configuration for the design of the two safety paths.

The features for attaining this object, pursuant to one embodiment of the invention, reside in that through the use of digital signals, one of the safety paths monitors electronic actuation devices provided for each consumer, and the other safety path monitors the flow of current through the respective consumer.

In a further configuration of the invention it is proposed that in the first safety path a signal of predetermined frequency (such as for example 1 kHz) which is outputted from a microprocessor in the control device is checked in respect of presence and fault tolerance and a component failure is checked by a fail-safe circuit.

In accordance with a further configuration of the invention it is provided that the second safety path includes the switch of the safety relay, which switch is closed in normal operation, the consumer, a triac for actuation thereof and a measuring member for detecting the flow of current through that safety path. In accordance with the invention, instead of a triac, it is in principle also possible to use a relay or a transistor as the actuable electrical switch.

The invention can be used to advantage in relation to a plurality of glass ceramic cooking surfaces or panels. In that case the safety relay is common for all solenoid valves, and the first and second safety paths can either be individually associated with each consumer (cooking surface) or—preferably—the first safety path is common to all consumers whereas the second safety path is provided separately for each consumer.

A further development of the invention in regard to the configuration of the first safety path provides that an AND-member serves for checking the presence of the signal and a band pass filter serves for checking the frequency tolerance of the signal. In this context the term AND-member is intended generally to denote an AND-logic interconnection function.

A further development of the invention, in regard to the second safety path, provides that the measuring member is an ohmic resistor (shunt resistor) at which the existence of a voltage drop is detected.

BRIEF DESCRIPTION OF THE DRAWINGS

The invention will be described in greater detail hereinafter by means of an embodiment with reference to the drawing in which.

DETAILED DESCRIPTION OF PREFERRED EMBODIMENTS

Figure 1:
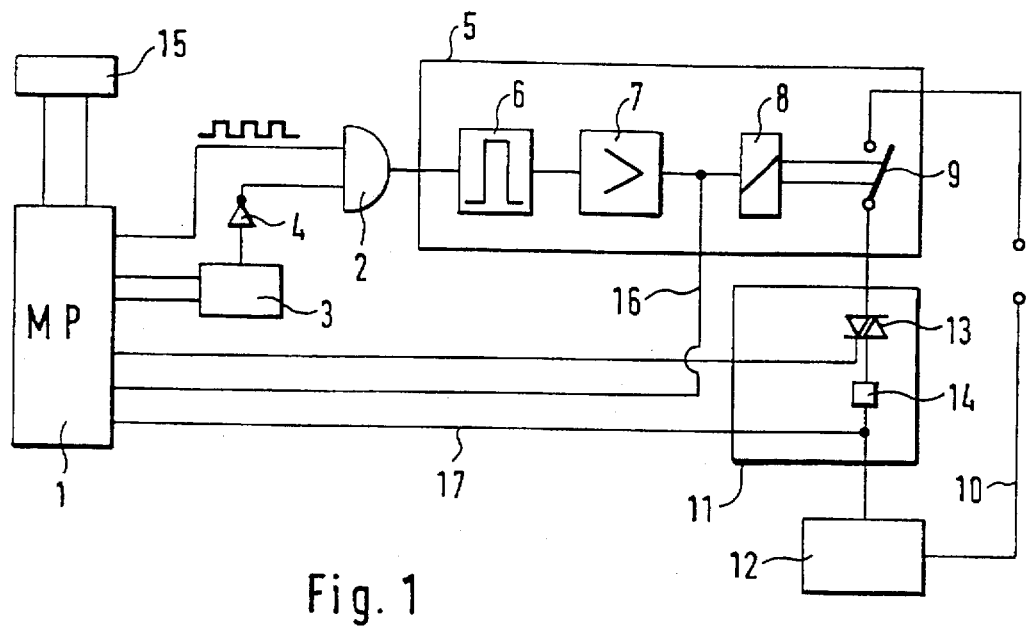
FIG. 1 is a block circuit diagram of the electronic control device with the two safety paths.

The essential component in the electronic control device is a microprocessor 1 which controls the operation of all items of equipment in the glass ceramic cooking panel or surface. It is therefore important to check failure thereof. It is also important to monitor switching-on of the solenoid valves or the gas burners. If proper functioning does not occur here, the feed of gas must be immediately switched off.

Connected on the output side of the microprocessor 1 is an AND-gate 2, to the one input of which is applied a frequency in the microprocessor, in the present case 1 kHz. Applied to the other input of the AND-gate 2 is overvoltage signal from a mains unit 3, which latter ensures the supply of power to the electronic control device. The output signal of the mains unit 3 is negated by an inverter 4. The first safety path 5 is connected to the output of the AND-gate 2. The first safety path 5 includes a band pass filter 6, an amplifier circuit 7 which is fail-safe and a safety relay 8 with its associated switching contact 9. That switching contact 9 is part of a circuit 10 which is monitored by the second safety path 11. Part of the circuit 10 is a solenoid valve 12 or alternatively a gas burner, that is to say in general terms, a safety-sensitive consumer.

The second safety path 11 includes a triac 13 and a measuring resistor 14. Under the control of the microprocessor 1, the triac serves to connect through the circuit 10 when the solenoid valve or the gas burner is to be supplied with power, that is to say is to be set in operation. The measuring resistor 14 serves to detect whether a current is or is not flowing in the circuit 10.

Finally, to indicate a fault situation, a fault display 15 is also connected to the microprocessor 1. The fault display 15 can be in the form of a lamp or an acoustic signal generator or also a display device.

The mode of operation of the control device shown in FIG. 1 is as follows. In routine operation the microprocessor 1 outputs to the AND-gate 2 a rectangular signal at a frequency of 1 kHz. In normal operation the mains unit does not output any overvoltage signal, and at the output of the inverter 4 there is produced a signal which, together with the 1 kHz-signal at the other output of the AND-gate, switches same through at a cycle rate of 1 kHz. Both the presence of a 1 kHz-signal and also the maintenance of a fault tolerance of 10% in regard to that signal is detected in the downstream-disposed band pass filter 6 which represents a commercially available component and which therefore is not described in greater detail at this point. If there is no signal or if the signal differs from the frequency of 1 kHz by more than ±10%, no signal is outputted at the output of the band pass filter 6. The amplifier 7 serves to amplify the 1 kHz-signal, that amplifier circuit 7 being fail-safe, in other words, the failure of a component in that circuit is immediately evaluated as meaning that no signal is outputted at the output of the amplifier 7, even if such a signal has been produced by the band pass filter 6. When a signal is present at the output of the amplifier 7, current is supplied to the safety relay 8 and the switch contact 9 which is open in the rest condition is closed. Provided at the output of the amplifier 7 is a line 16 which is connected to the microprocessor 1 and which signals thereto whether there is a signal at the output of the amplifier 7. As can also be seen from FIG. 2 the output signal at the amplifier 7 is a dc voltage signal.

If the microprocessor 1 receives from the exterior a command that a cocking surface or panel is to be heated, the microprocessor 1 passes a switching pulse to the triac 13 which switches through the circuit 10 in order to supply power to the solenoid valve 12 or a gas burner. In normal operation of the control device the switching contact 9 is already closed in a preparatory step so that in this case, when the triac 13 is switched through, current flows through the solenoid valve. A voltage drop occurs at the measuring resistor 14 and that voltage is signalled back to the microprocessor by way of a line 17 to demonstrate that the solenoid valve is supplied with power.

In a fault situation, if for example the microprocessor is not operating properly, it is to be assumed that the 1 kHz-signal does not occur or does not properly occur. In that case the AND-gate 2 is not switched through, the signal at its output disappears, no signals occur at the output of the band pass filter 6 and the amplifier 7, and thus the signal on the line 16 disappears and the microprocessor receives a feedback message. The processing of that signal must be such that the microprocessor can also actuate the fault display 15 in the fault situation. Independently thereof, because the safety relay 8 is not supplied with current, the switching contact 9 thereof has been released and the circuit 10 opened. The solenoid valve—or the gas burner—no longer receives any power and the flow of gas is interrupted. The same functioning occurs if the mains unit 3 outputs an overvoltage. In that case, a signal is outputted, which is negated in the inverter 4, whereby the signal at the input of the AND-gate 2 disappears.

If a failure of components occurs in the band pass filter 6 or in the amplifier 7, the signal also disappears at the output of the amplifier 7, with the result that the safety relay 8 no longer receives current and the switching contact 9 opens.

A further fault can be that the triac 13 is switched through and, because the switching contact 9 is closed, a current flows in the circuit 10 although the triac 13 has not received an actuating signal. In that case the measuring resistor 14 detects the flow of current and the microprocessor 1 recognises that a current is flowing in the circuit 10, without a corresponding command. In that case it switches off the 1 kHz-signal and at the same time outputs a signal to the fault display 15.

Checking of the failure on the part of the microprocessor 1 is also important for the reason that it also provides for the control of a fan wheel (not shown in the drawing) which serves in the cooking appliance for cooling purposes and for the feed of oxygen to the burners. If that fan wheel is not properly rotating, either because the microprocessor is defective or because the speed of rotation thereof is not at the required values because of other interference influences, the 1 kHz-signal is switched off by the microprocessor and the fault display 15 is switched on.

Figure 2:
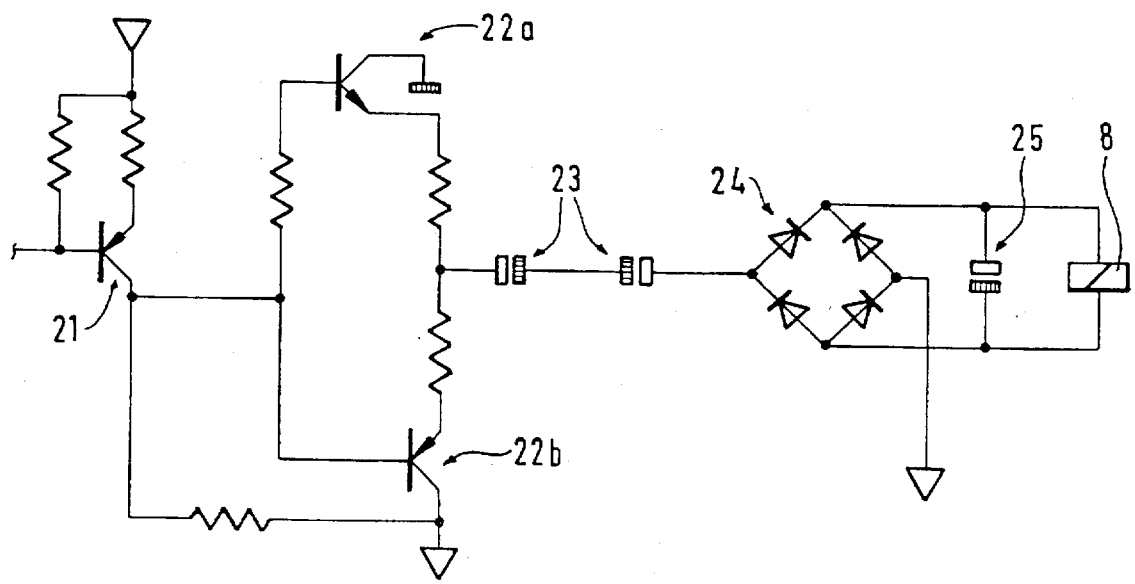
FIG. 2 shows a fail-safe circuit in the first safety path.

FIG. 2 shows a possible configuration of the amplifier circuit 7. By way of an input transistor 21 the incoming rectangular signal is amplified by way of push-pull amplifiers 22a and 22b and passed by way of filter capacitors 23 to a rectifier bridge 24. Connected on the output side of the latter are a smoothing capacitor 25 and the safety relay 8 already described above. If the signal at the transistor 21 disappears, the voltage at the output of the rectifier bridge 24 thus also disappears and therewith the voltage at the safety relay 8. In the event of failure of one of the components of that circuit as shown in FIG. 2, the voltage at the output of the rectifier bridge 24 respectively disappears, with the above-described consequence in regard to the safety relay 8.

Figure 3:
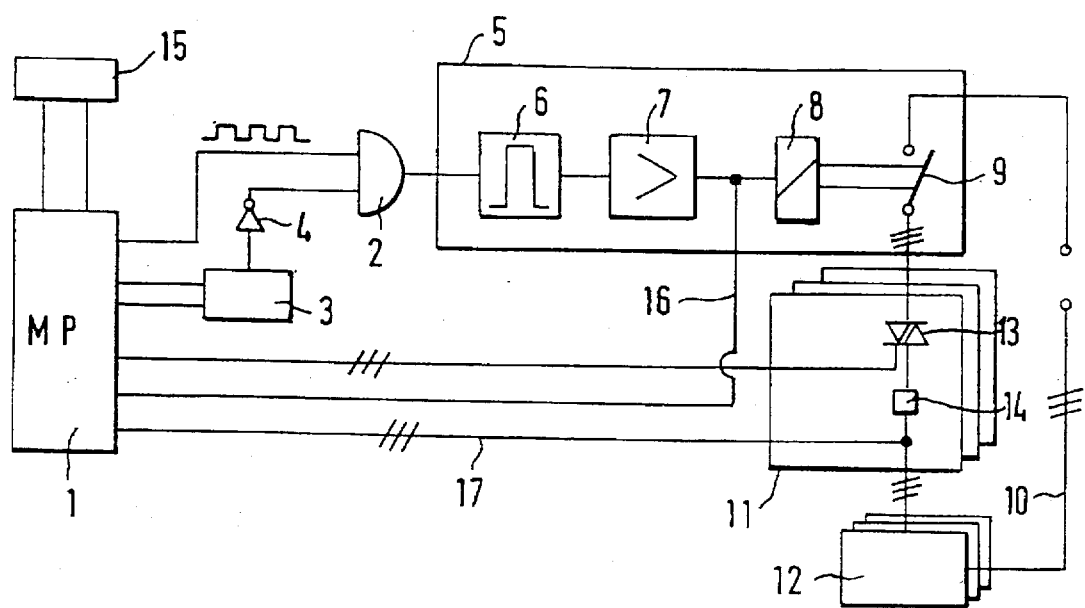
FIG. 3 is a block circuit diagram of the arrangement shown in FIG. 1 for use in relation to a plurality of consumer.

FIG. 3 is a block circuit diagram showing the possibility of actuating a plurality of glass ceramic cooking surfaces or panels 12, more specifically in this case three. There is one safety path 5 whereas there are three safety paths 11. The corresponding lines, of which there are also a plurality, are identified by a corresponding number of transverse strokes. The mode of operation of the circuit arrangement corresponds in terms of its basic principle to that shown in FIG. 1.

We claim:

1. A gas-heated apparatus, such as a cooking appliance having at least one glass ceramic cooking surface, said apparatus having at least one gas jet burner, a safety relay; solenoid valves monitored by the safety relay arranged in a gas supply installation; an electronic control device for the operation of the apparatus including two mutually independent safety paths for monitoring the same safety-sensitive consumers comprising said solenoid valves through two different criteria wherein through the use of digital signals, a first of said safety paths monitors electronic actuation means for each said consumer, and the second said safety path monitors the flow of current through the same said actuated consumer.

2. A gas-heated apparatus, such as a cooking appliance having at least one glass ceramic cooking surface, said apparatus having at least one gas jet burner; a safety relay; said at least one burner being monitored by the safety relay arranged in a gas supply installation; an electronic control device for the operation of the apparatus including two mutually independent safety paths for monitoring safety-sensitive consumers such as said at least one burner through two different criteria, wherein through the use of digital signals, a first of said safety paths monitors electronic actuation means for each said consumer, and the second said safety path monitors the flow of current through the same said actuated consumer.

3. A gas-heated apparatus according to claim 1 or 2, wherein said first safety path monitors a signal of predetermined frequency which is outputted from a microprocessor which is arranged in the control device for presence thereof and frequency tolerance; and a fail-safe circuit monitors any component failure of said apparatus.

4. A gas-heated apparatus according to claim 3, wherein said signal frequency is at approximately 1 kHg.

5. A gas-heated apparatus according to claim 4, wherein said measuring element is an ohmic resistor at which there is detected the occurrence of a voltage drop.

6. A gas-heated apparatus according to claim 3, wherein an AND-element is provided for checking for the presence of said signal, and a band-pass filter is provided for checking the frequency tolerance of said signal.

7. A gas-heated apparatus according to claim 3, wherein said fail-safe circuit serves for the amplification and rectification of said signal, and the safety relay is connected to the output of said circuit.

8. A gas-heated apparatus according to claim 1 or 2, wherein said second safety path includes a switch of said safety relay, said switch being closed during normal operation, said consumer, a triac for the actuation of said consumer, and a measuring element for determining the flow of current through said safety path.

9. A gas-heated apparatus according to claim 1 or 2, comprising a plurality of said glass ceramic cooking surfaces.

10. A gas-heated apparatus according to claim 1 or 2, wherein said first safety path is common to all of said consumers, and the second safety path is separate for each consumer.

* * * * *